United States Patent
Okazaki

(10) Patent No.: US 6,712,165 B1
(45) Date of Patent: Mar. 30, 2004

(54) HYBRID VEHICLE

(75) Inventor: Akihito Okazaki, Saitama (JP)

(73) Assignee: Nissan Diesel Motor Co., Ltd., Saitama (JP)

( * ) Notice: Subject to any disclaimer, the term of this patent is extended or adjusted under 35 U.S.C. 154(b) by 0 days.

(21) Appl. No.: 09/980,476

(22) PCT Filed: Mar. 30, 2000

(86) PCT No.: PCT/JP00/02026
§ 371 (c)(1),
(2), (4) Date: Apr. 9, 2002

(87) PCT Pub. No.: WO00/74966
PCT Pub. Date: Dec. 14, 2000

(30) Foreign Application Priority Data

Jun. 8, 1999 (JP) .......................................... 11/160759

(51) Int. Cl.⁷ ................................................. B60K 1/00
(52) U.S. Cl. ..................... 180/65.2; 180/65.3; 180/65.7; 477/4
(58) Field of Search ............................... 180/65.2, 65.3, 180/65.4, 65.7; 303/152; 477/3, 4, 5, 9, 12, 171, 173

(56) References Cited

U.S. PATENT DOCUMENTS

| 4,042,056 | A | * | 8/1977 | Horwinski | .................. 180/65.2 |
| 4,335,429 | A | * | 6/1982 | Kawakatsu | .................. 701/102 |
| 5,343,970 | A | * | 9/1994 | Severinsky | ................. 180/65.2 |
| 5,713,425 | A | * | 2/1998 | Buschhaus et al. | ........ 180/65.2 |
| 5,788,006 | A | * | 8/1998 | Yamaguchi | ................ 180/65.2 |
| 5,865,263 | A | * | 2/1999 | Yamaguchi et al. | ....... 180/65.2 |
| 6,019,183 | A | | 2/2000 | Shimasaki et al. | |
| 6,077,186 | A | * | 6/2000 | Kojima et al. | .................. 477/3 |
| 6,098,733 | A | * | 8/2000 | Ibaraki et al. | ............. 180/65.2 |
| 6,116,363 | A | * | 9/2000 | Frank | ......................... 180/65.2 |
| 6,253,865 | B1 | * | 7/2001 | Suzuki | ...................... 180/65.2 |
| 6,316,842 | B1 | * | 11/2001 | Kuroda et al. | ............ 290/40 C |

FOREIGN PATENT DOCUMENTS

| EP | 0916547 A2 | 5/1999 |
| JP | 08-275305 | 10/1996 |
| JP | 10-252517 | 9/1998 |
| JP | 10-295002 | 11/1998 |
| JP | 10-313505 | 11/1998 |
| JP | 11-1418390 | 6/1999 |

* cited by examiner

Primary Examiner—Brian L. Johnson
Assistant Examiner—Brian L Swenson
(74) Attorney, Agent, or Firm—Rabin & Berdo, P.C.

(57) ABSTRACT

A hybrid vehicle that is provided with an engine and a motor generator as power sources, includes a clutch which automatically engages or disengages to cause or interrupt rotation transmission between the output shaft of the engine and the input shaft of a transmission, a power transmission mechanism which transmits power between the input/output shaft of the motor generator and the input shaft of the transmission, and a hybrid control unit which selectively disengages the clutch and drives the motor generator. The clutch is disengaged according to running conditions, and the rotation speed of the motor generator is varied by the transmission to drive the vehicle. In this way, the region in which the motor generator operates efficiently is expanded, and fuel consumption by the hybrid vehicle is reduced.

2 Claims, 5 Drawing Sheets

FIG. 1

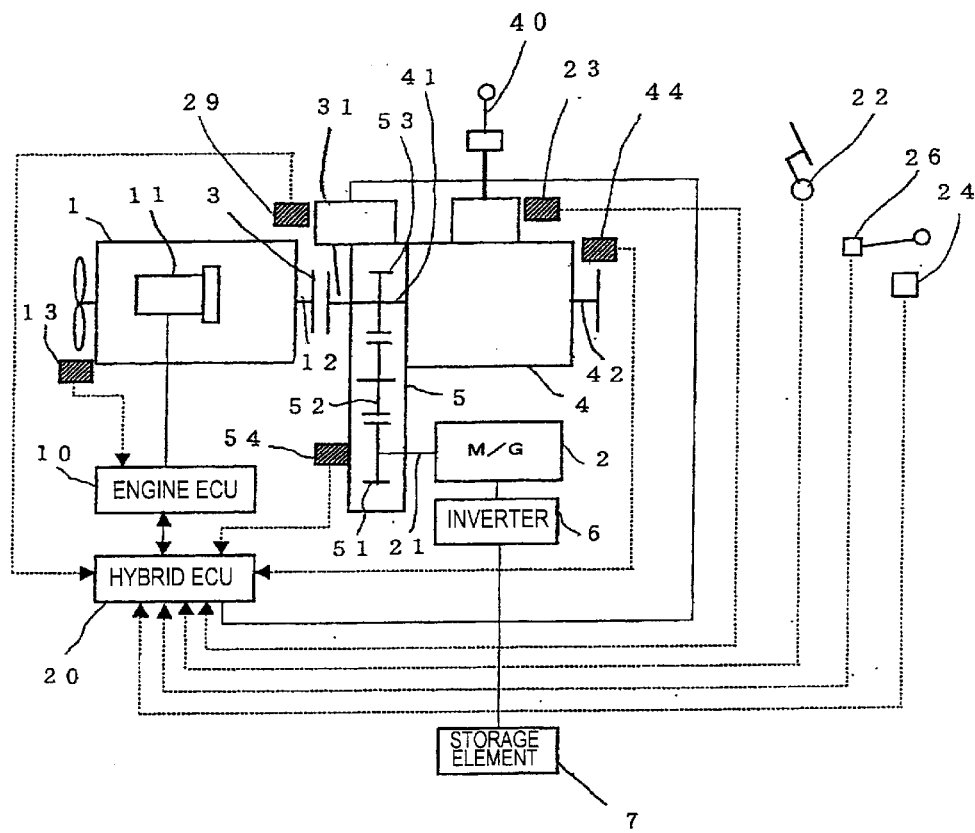

1 ENGINE
2 MOTOR GENERATOR (ROTATING MACHINE)
3 AUTOMATIC CLUTCH
4 TRANSMISSION
5 REDUCTION GEAR DEVICE (POWER TRANSITION MECHANISM)
6 INVERTER
7 POWER STORAGE ELEMENT
10 ENGINE CONTROL UNIT
12 ENGINE OUTPUT SHAFT
13 ENGINE ROTATION SPEED SENSOR
20 HYBRID CONTROL UNIT
21 MOTOR GENERATOR INPUT/OUTPUT SHAFT
23 GEAR POSITION SENSOR
24 EMERGENCY SWITCH
26 AUXILIARY BRAKE SWITCH
29 CLUTCH POSITION SENSOR
41 TRANSMISSION INPUT SHAFT
42 TRANSMISSION OUTPUT SHAFT
44 ROTATION SPEED SENSOR FOR TRANSMISSION OUTPUT SHAFT
54 ROTATION SPEED SENSOR FOR TRANSMISSION INPUT SHAFT

HYBRID VEHICLE

FIELD OF THE INVENTION

This invention relates to a hybrid vehicle provided with a combustion engine and an electric motor as a source of power.

BACKGROUND OF THE INVENTION

In a parallel type hybrid vehicle, where a motor generator is connected to the output shaft of the engine, power is supplied to the motor generator and the output of the engine is thereby assisted if needed during acceleration. During deceleration and braking, fuel supply to the engine is stopped, the motor generator is operated as a generator, and the power generated is used to charge the battery (JP-A-H10-295002, JP-A-H10-252517 and JP-A-H8-275305). In a series type hybrid vehicle, only the motor generator drives the wheels and the engine drives only the generator (JP-A-H10-313505).

In the above conventional parallel hybrid vehicle, the motor generator was always operated together with the engine, namely, the vehicle cannot run by the driving force of the motor generator alone while the operation of the engine is stopped. This limits the operating range in which the motor generator can be used efficiently. In a hybrid vehicle wherein the motor generator is directly connected to the output shaft of the engine, or the drive shaft of the wheels, the rotation speed ratio between the motor generator and engine or between the motor generator and the drive shaft is fixed, so the motor generators which can be used are limited. Further, in the above-mentioned hybrid vehicles, a flywheel or vehicle wheels must have a special construction to install the motor generator, and this leads to a cost increase.

DISCLOSURE OF THE INVENTION

This invention is a hybrid vehicle comprising a transmission wherein the rotation speed ratio of the input shaft and output shaft is varied, a clutch which engages/disengages so as to connect/disconnect the output shaft of the engine and the input shaft of the transmission, a motor generator which functions both as a motor and a generator, a power transmission mechanism which transmits rotation between the input/output shaft of the motor generator and the input shaft of the transmission, a power storage element which stores power supplied to the motor generator, and a motor running control means which disengages the clutch according to running conditions and drives the motor generator.

In this invention, the engine output shaft and the input/output shaft of the motor generator are connected via the clutch and the transmission. Therefore, by disengaging the clutch, it is possible to stop operation of the engine in the low speed, low load region, and to run the vehicle under the power of only the motor generator. This expands the running region of the motor generator, achieves reduction of fuel consumption, improves power performance and reduces exhaust gas emissions. In this invention, as the rotation of the motor generator can be transmitted to the drive shaft of the wheels at any speed ratio, motor generators of various specifications may be used. Further, as it is unnecessary to adopt a special construction for the drive system of the flywheel of the engine or the wheels to install the motor generator, costs are reduced.

The above power transmission mechanism may be a construction wherein power is transmitted to the input shaft of the transmission by reducing the rotation of the input/output shaft of the motor generator. Hence, there is less restriction on the specification of the motor generator, and a smaller motor generator may be used.

In the hybrid vehicle of this invention, a starting-by-motor control means which disengages the clutch and drives the motor generator when the power storage amount exceeds a predetermined value and the vehicle starts, and a starting-by-engine control means which engages the clutch and drives the engine when the power storage amount falls below a predetermined value and the vehicle starts, are provided. By disengaging the clutch and driving the motor generator when there is sufficient stored charge and the vehicle starts, the engine can be stopped when the vehicle starts, and noise and fuel consumption can be still further reduced.

In the hybrid vehicle of this invention, a power source change-over means may be provided which changes over from the running state when the clutch is disengaged and the motor generator is driven, to the running state when the clutch is engaged and the engine is driven, as the vehicle speed rises. By changing over from the running state when the clutch is disengaged and the motor generator is driven, to the running state when the clutch is engaged and the engine is driven as the vehicle speed rises, sufficient power is always obtained.

In the hybrid vehicle of this invention, a brake detecting means which detects when the vehicle is braking, and a braking regeneration control means which makes the motor generator regenerate power during braking, may also be provided. By making the motor generator regenerate power when the vehicle is braking, the kinetic energy of the vehicle is effectively recovered and the load on damping devices can be mitigated.

BRIEF DESCRIPTION OF THE DRAWINGS

FIG. 1 is a schematic view of one embodiment of a hybrid vehicle according to this invention.

DESCRIPTION OF THE PREFERRED EMBODIMENTS

Figure 2:
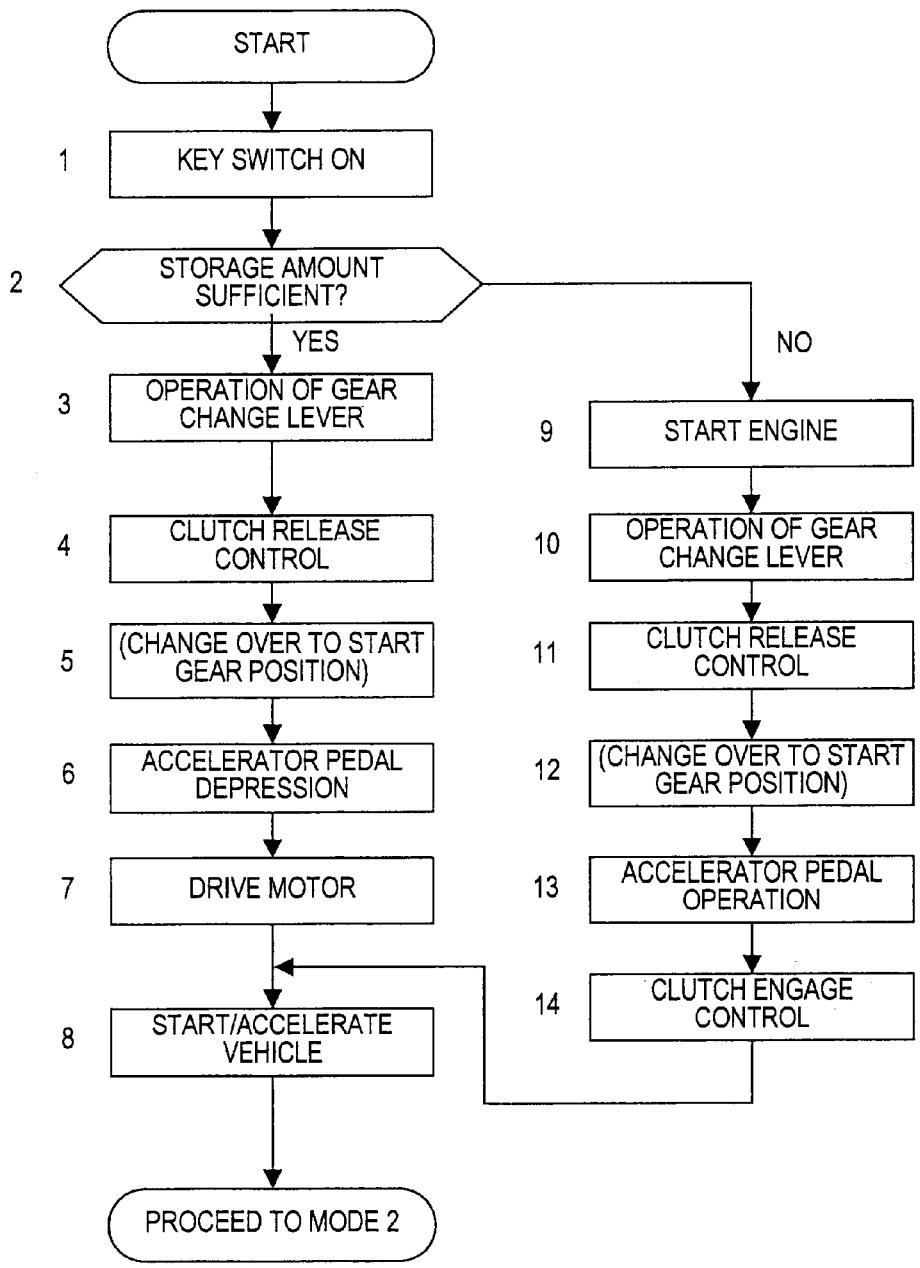
FIG. 2 is a flowchart showing the control performed when the hybrid vehicle starts.

As shown in FIG. 1, a power train of a vehicle is provided with an engine 1, a clutch 3 and a manual transmission 4. The output of the engine 1 is transmitted to an input shaft 41 of the transmission 4 by the clutch 3, and the rotation of an output shaft 42 of the transmission 4 is transmitted to wheels on either side via a differential gear and a drive shaft from a propeller shaft, not shown.

The engine 1 burns fuel supplied from a fuel injection pump 11 in a cylinder, and drives an output shaft 12 via pistons which reciprocate in the cylinder. An engine control unit 10 controls the fuel amount supplied from the fuel injection pump 11 according to a detection signal from an engine rotation speed sensor 13 and a request information signal from a hybrid control unit 20 described later, and adjusts the power output of the engine 1.

In the clutch 3, connection and disconnection of the engine output shaft 12 and the transmission input shaft 41 are performed by a clutch booster 31. The clutch booster 31 engages and disengages the clutch 3 by controlling air pressure via a valve interlocked with a clutch pedal operated by the driver, not shown, and the clutch 3 is engaged and disengaged automatically by controlling the air pressure via a solenoid valve, not shown, in response to a signal from the hybrid control unit 20.

The transmission 4 performs gear change-over when the driver operates a gear change lever 40.

The power train of the vehicle is provided with a motor generator 2 and a reduction gear device 5 which transmits the rotation of the motor generator 2 to the transmission input shaft 41 at a predetermined rotation speed ratio. The reduction gear device 5 corresponds to the power transmission mechanism of this invention.

The motor generator 2 is an alternating current machine such as a three-phase synchronous motor or a three-phase induction motor, and is driven by an inverter 6. The inverter 6 is connected to a power storage element 7, changes direct current power of the power storage element 7 into alternating current power, and supplies the motor generator 2. Also, the alternating current power of the motor generator 2 is converted to direct current power and charges the power storage element 7. The power storage element 7 may be various types of storage battery using chemical reactions, or an electric two-phase capacitor battery. The motor generator 2 is not limited to an alternating current motor, and may also be a direct current motor and be driven by a DC/DC converter.

The reduction gear device 5 comprises a drive gear 51 connected to the input/output shaft 21 of the motor generator 2, a driven gear 53 connected to the transmission input shaft 41, and an idler gear 52 which meshes with both. The reduction gear device 5 slows down rotation of the motor generator input/output shaft 21 when the motor generator 2 is driven, and transmits it to the transmission input shaft 41. It also increases the rotation of the transmission input shaft 41 and transmits it to the motor generator input/output shaft 21, when the motor generator 2 is regenerating power.

The hybrid control unit 20 has the functions of the running control means, starting-by-motor control means, starting-by-engine control means, power source change-over means, braking detecting means and braking regeneration control means of this invention. Detection signals from an auxiliary brake switch 26, emergency switch 24, acceleration depression amount sensor 22, position sensor 29 of the clutch 3, gear position sensor 23 of the transmission 4, rotation speed sensor 44 of the transmission output shaft 42, rotation speed sensor 54 of the transmission input shaft 41 and information signal from the engine control unit 10, are input into this hybrid control unit 20. The accelerator depression amount sensor 22 detects the required load based on the depression amount of the accelerator operated by the driver. The position sensor 29 of the clutch 3 detects the engaging/disengaging of the clutch 3 which operates via the clutch booster 31. If the auxiliary brake switch 26 is switched on based on the lever position operated by the driver, an auxiliary brake, such as an exhaust brake which is not shown, will operate. The emergency switch 24 changes over between system operation and stop based on the position of the lever operated by the driver, and when a certain defect occurs in the system, it can suspend control of the clutch booster 31 and inverter 6 by the hybrid control unit 20.

The hybrid control unit 20 controls the operation of the clutch booster 31 and inverter 6 according to the running conditions based on these signals, outputs a request information signal to the engine control unit 10 and thereby controls operation of the engine 1.

The engine control unit 10 and the hybrid control unit 20 transmit and receive information via a communication circuit, and perform mutual control. The hybrid control unit 20 stops operation of the engine 1 when the vehicle starts or runs at low speed, and performs running-by-motor control which drives the motor generator 2 with the clutch 3 disengaged.

The flowchart of FIG. 2 shows the routine performed when the vehicle is starting or accelerating. This routine is performed at a fixed interval in the hybrid control unit 20. First, in a Step 1, it is determined that a key switch, not shown, is ON, and in a Step 2, it is determined whether or not the power storage amount of the power storage element 7 exceeds a predetermined value. This predetermined value is previously set as a power storage amount required for starting or accelerating only by the motor generator 2.

In the Step 2, when it is determined that the power storage amount is sufficient, the routine proceeds to Steps 3–8 and starting by the motor generator 2 is performed. Namely, in the Step 3, operation of the gear change lever 40 is detected, in the Step 4 the clutch 3 is released and the engine output shaft 12 is disconnected from the transmission input shaft 41, in a Step 5, the transmission 4 is changed over to the start gear position, and preparation is made to start only by the motor generator 2. In the next Step 6, when it is determined that the accelerator pedal is depressed based on the detection signal of the accelerator depression amount sensor 22, the routine proceeds to the Steps 7 and 8, and the motor generator 2 is driven by an output according to the accelerator depression amount. In this way, the vehicle is started only by the power of the motor generator 2.

On the other hand, if it is determined that, when the key switch is ON, there is not enough power storage amount in the Step 2, the routine proceeds to Steps 9–14, and the vehicle is started by the engine 1. Specifically, in the Step 9, a starting motor, not shown, is driven and the engine 1 is started. In the Step 10, the operation of the gear change lever 40 is detected, in the Step 11, the clutch 3 is released and the engine output shaft 12 is disconnected from the transmission input shaft 41, in the Step 12, the transmission 4 changes over to the start gear position, and preparation is made to start by the engine 1. In a next Step 13, when it is determined that the accelerator pedal is depressed based on the detection signal of the accelerator depression amount sensor 22, the routine proceeds to the Step 14 and the clutch 3 is engaged. In this way, the vehicle is started only by the power of the engine 1.

Figure 3:
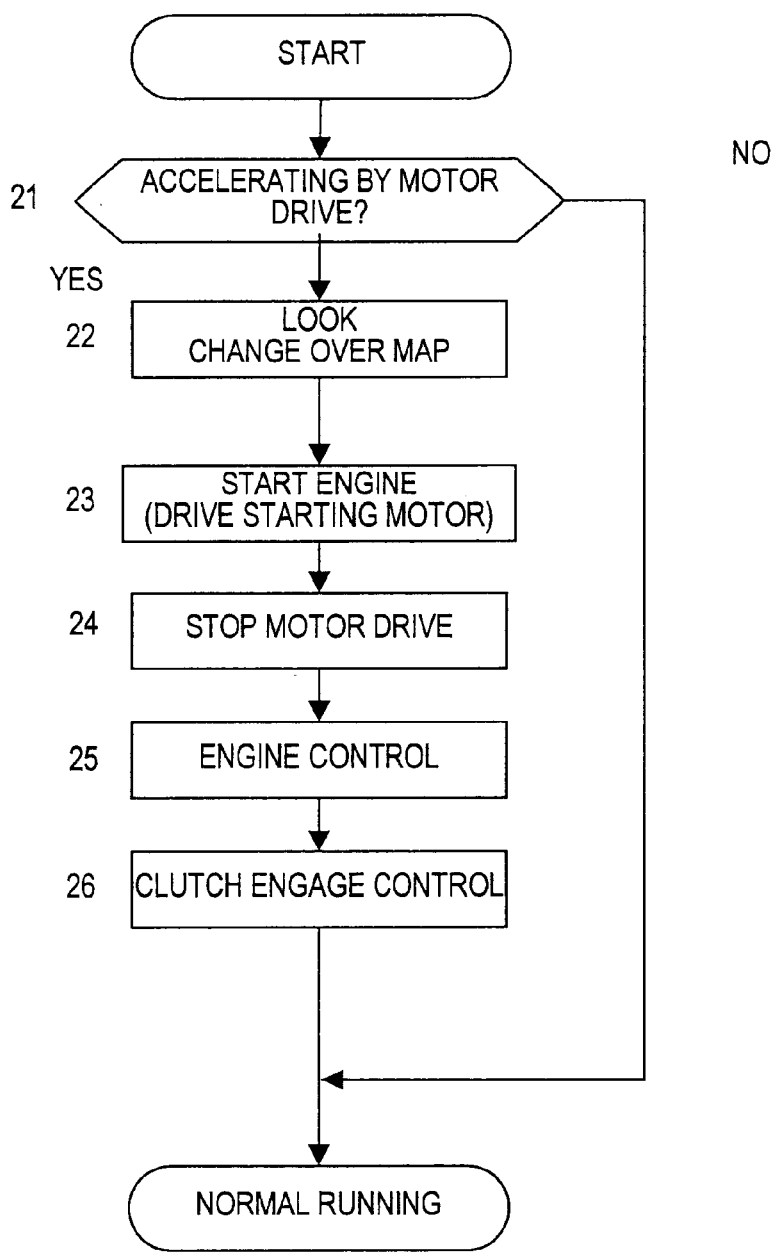
FIG. 3 is a flowchart showing the control performed when the vehicle is accelerating/cruising.

The flowchart of FIG. 3 shows the routine performed when the vehicle is accelerating or cruising, and is performed at a fixed interval by the hybrid control unit 20. First, in a Step 21, when it is determined that the vehicle is accelerating only by the motor generator 2, the routine proceeds to a Step 22. In the Step 22, when it is determined that the vehicle speed exceeds a predetermined value based on a preset map, the routine proceeds to a Step 23 and subsequent steps, and changes over from running only by the motor generator 2 to running by the engine 1. Namely, in the Step 23, the engine 1 is started, in a Step 24, the drive of the motor generator 2 is stopped, in a Step 25, operation of the engine 1 is controlled, and in a Step 26, the clutch 3 is engaged. In the running state where the power of the engine 1 is transmitted to the wheels, as the vehicle speed rises, the speed change gear position is changed over by a driver operation.

Also, when the engine 1 is operating, based on a preset map, the motor generator 2 is driven according to the detection signal of the rotation speed sensor 54 and the accelerator depression amount sensor 22, and the drive force of the engine 1 is assisted by the drive force of the motor generator 2. This improves the acceleration performance and the hill climbing performance of the vehicle.

Figure 4:
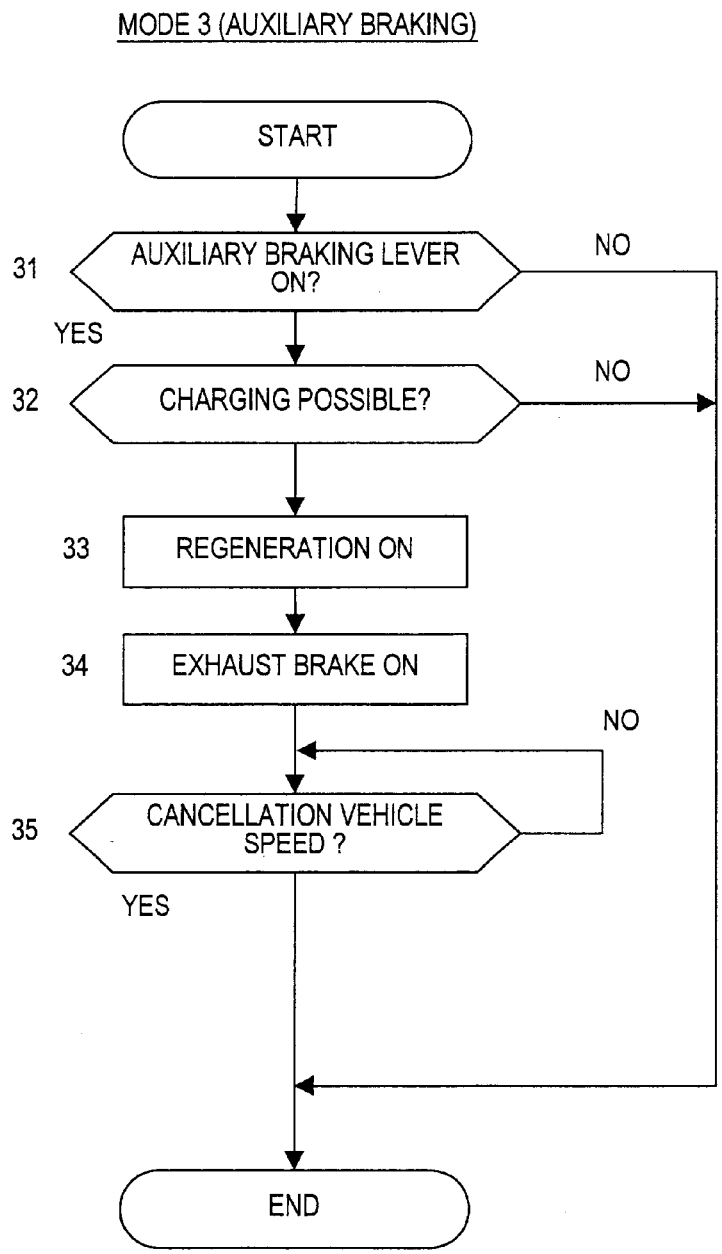
FIG. 4 is a flowchart showing the control performed during auxiliary braking.

The flowchart of FIG. 4 shows the routine performed when the vehicle is braking, and is performed at a fixed interval by the hybrid control unit 20. First, in a Step 31, it is determined whether or not the auxiliary brake switch 26 is ON and there is auxiliary braking, then the routine proceeds to a Step 32, and it is determined whether or not the power storage amount in the power storage element 7 is less than a predetermined value and charging is possible. Here, when it is determined that there is auxiliary braking, and that charging is possible, the routine proceeds to a Step 33, power is regenerated by the motor generator 2, and an exhaust brake is operated. The routine then proceeds to a following step S35, and when it is determined that the vehicle speed has fallen to less than a predetermined value, this routine is terminated. In this way, by having the motor generator 2 regenerate power during auxiliary braking, sufficient deceleration is obtained due to the braking effect of the exhaust brake and the braking effect when the motor generator 2 regenerates power, so fuel consumption is reduced.

When the vehicle is running while the power of the engine 1 is transmitted to the wheels via the transmission 4, if the power storage amount in the power storage element 7 falls to less than predetermined value, the power of the engine 1 is transmitted to the motor generator 2 via the reduction gear device 5, and the power generated by the motor generator 2 is supplied to the power storage element 7 via the inverter 6 to charge it. When the vehicle has stopped and the power storage amount in the power storage element 7 is sufficient, the engine 1 is stopped, and fuel consumption is economized. On the other hand, when the vehicle has stopped and the power storage amount in the power storage element 7 has fallen below the predetermined value, the clutch 3 is engaged when the transmission 4 is in the neutral position, the engine 1 is operated, the power of the engine 1 is transmitted to the motor generator 2 via the reduction gear device 5, and the power generated by the motor generator 2 is supplied to the power storage element 7 via the inverter 6 to charge it.

As mentioned above, the motor generator 2 rotates together with the input shaft 41 of the transmission 4, and by using the clutch 3, the rotation transmission between the engine 1 and motor generator can be interrupted. For this reason, the operation of the engine 1 can be stopped and the vehicle can be run only by the driving force of the motor generator 2 in the low load, low speed region, therefore the region wherein the motor generator 2 operates efficiently is expanded.

When the vehicle is running without using the driving force of the motor generator 2, the driver adjusts the output of the engine 1, and changes the gears of the transmission 4 to adjust the vehicle speed. In this case, it is not necessary to make the transmission 4 automatic, so production costs can be cut. When the vehicle is running while the motor generator 2 does not generate driving force, and does not generate power either, the motor generator 2 rotates with the input shaft 41 of transmission 4, and functions as a flywheel due to its inertial mass.

As the reduction gear device 5 can transmit the rotation of the motor generator 2 to the drive system of the input shaft 41 of the transmission 4 at any speed ratio, the restrictions on the specification of the motor generator 2 can be reduced. Further, it is unnecessary to apply a special construction to the flywheel of the engine or the drive system of the wheels to install the motor generator 2 in the power train, therefore the cost of these units can be reduced.

Figure 5:
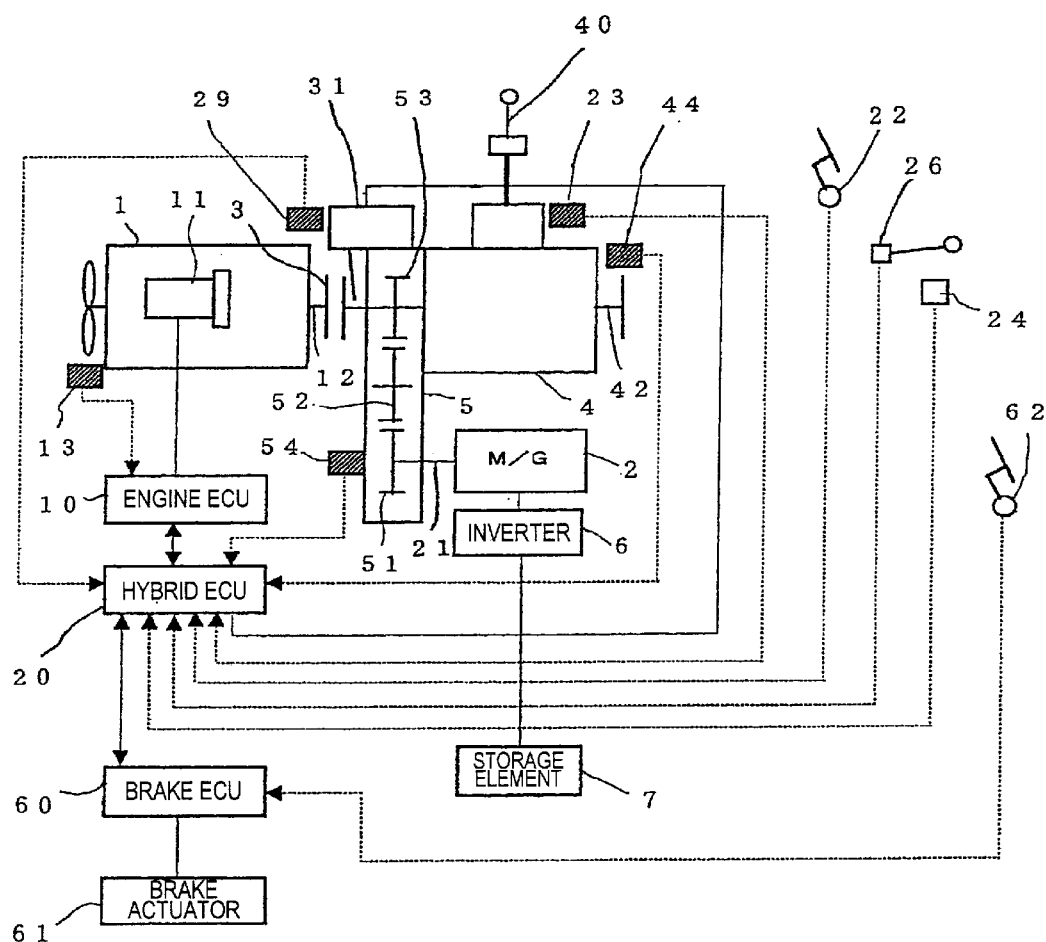
FIG. 5 is a conceptual view of another embodiment of a hybrid vehicle according to this invention.

FIG. 5 shows another embodiment of the hybrid vehicle of this invention. The same symbols are given to the same parts as those of the embodiment shown in FIG. 1.

This hybrid vehicle comprises a request braking force detection sensor 62 which detects the depression amount of a brake pedal, a brake actuator 61 which adjusts the braking force of the service brake of the vehicle, and a brake control unit 60 which adjusts the braking force of the service brake of the vehicle according to a detection signal from the request braking force detection sensor 62.

The brake control unit 60, the engine control unit 10 and the hybrid control unit 20 transmit and receive information via a communication circuit, and perform mutual control. The brake control unit 60 operates the service brake via the brake actuator 61 according to the depression of the brake pedal and sends a command to the hybrid control unit 20 to make the motor generator 2 regenerate power, and controls the regenerated power according to the request braking force.

In this case, the regenerated power of the motor generator 2 when the vehicle is decelerating can be increased, the kinetic energy of the vehicle can be effectively recovered, and the load on the service brake can be mitigated. Further, also in the mode wherein the motor generator 2 is not made to regenerate power when the vehicle is decelerating via the auxiliary brake switch 26, power is regenerated by the motor generator 2 as the brake pedal is depressed, so the kinetic energy of the vehicle can be recovered.

The hybrid control unit 20 determines the braking conditions according to the request signal from the brake control unit 60, controls the power regenerated by the motor generator 2 according to braking conditions, engages the clutch 3 during sudden braking and makes the motor generator 2 regenerate power, whereas during slow braking, it disengages the clutch 3 and makes the motor generator 2 regenerate power. By engaging the clutch 3 during sudden braking and making the motor generator 2 regenerate power, sufficient braking is obtained due to the brake effect of the engine 1 and the brake effect of the motor generator 2. On the other hand, by disengaging the clutch 3 and making the motor generator 2 regenerate power, braking is performed softly only due to the braking of the motor generator 2. As a result, the region in which power is regenerated by the motor generator 2 is expanded, and fuel consumption can be economized.

What is claimed is:

1. A hybrid vehicle, comprising:

a drive wheel, a transmission having input and output shafts, the transmission varying the rotation speed ratio between the input shaft and the output shaft, and transmitting the rotation of the output shaft to the drive wheel, an engine having an output shaft, a clutch which engages/disengages the output shaft of the engine and the input shaft of the transmission, a motor generator which has an input/output shaft and which functions both as a motor and a generator, a power transmission mechanism which transmits rotation between the input/output shaft of the motor generator, and the input shaft of the transmission, a power storage element which stores the power supplied by the motor generator, running-by-motor control means which disengages the clutch according to running conditions and drives the motor generator, a brake which applies a braking force to the vehicle, braking detection means which detects braking of the vehicle, and regeneration control means which engages the clutch and causes the motor generator to regenerate power during sudden braking, and which disengages the clutch and causes the motor generator to generate power during slow braking.

2. A hybrid vehicle as defined in claim 1, wherein the motor generator regenerates power when the brake is applied.

* * * * *